Sept. 22, 1970     H. LEIBER     3,529,620

ELECTROMAGNETICALLY ACTUATED STROKE ADJUSTABLE VALVE

Filed Nov. 3, 1967     2 Sheets-Sheet 1

INVENTOR.
Heinz Leiber

BY *Spencer & Kaye*

ATTORNEYS

INVENTOR.
Heinz Leiber
BY Spencer & Kaye
ATTORNEYS

United States Patent Office 3,529,620
Patented Sept. 22, 1970

3,529,620
ELECTROMAGNETICALLY ACTUATED STROKE ADJUSTABLE VALVE
Heinz Leiber, Leimen, Germany, assignor to Teldix Gesellschaft mit beschrankter Haftung, Heidelberg, Germany
Filed Nov. 3, 1967, Ser. No. 680,366
Claims priority, application Germany, Nov. 4, 1966, 1,272,665
Int. Cl. F16k 11/02, 31/04
U.S. Cl. 137—269                                 9 Claims

ABSTRACT OF THE DISCLOSURE

An electromagnetically actuated valve having means for adjusting the stroke of the valve element. The valve includes a valve element arranged to move in two directions, and two means for limiting the movement of the valve element in both the directions; one of the means limiting the movement in one direction and the other means in the other direction. Either one or both of the limiting means can include a valve seat which may be closed, as desired, by the valve element; both of the limiting means are interchangeable. Both limiting means may additionally be selectively positionable with respect to the valve element, so that the stroke of the valve element may be adjusted.

BACKGROUND OF THE INVENTION

The present invention relates to electromagnetically actuated valves for shutting off the flow in pipes, and, in particular, to electromagnetically actuated miniature valves controlled by direct current.

Valves have been classified according to their switching function within a pipe system as three-way valves and as throughway or one-way valves. The last type of valves have been designated as closing or opening valves depending on whether they close or open, respectively, with excitation of the magnet winding. Until now solenoid valves, as they are called for short, have always been designed with their switching function in view with the result that valves having different switching functions are of considerably different construction and have a correspondingly large number of different individual parts.

In addition, the variations in the sizes of individual replaceable parts of the prior art valves, determined by the technical circumstances of manufacture, produce large variations in the operating and drop-out times—that is, the times required for the moving parts, after switching on or switching off the excitation current, to cover the distance of a stroke in one direction or the other, respectively. These variations in the individual actuating times of valves produced in one manufacturing series is especially troublesome in those applications where there is an exact predetermined relation between the switching duration of the input voltage and the opening or closing time of the valve.

Attempts have already been made, in fact, to solve this problem. In the solenoid valves according to U.S. Pat. No. 2,881,980, the stroke is made adjustable by means of a valve seat which may be screwed into the valve body. This solenoid valve is also provided with a means for adjusting the spring pretension. Even with this valve it is not possible, however, to effectively adjust the drop-out time independently of the operating time. Experience with this valve has shown, furthermore, that variations in the drop-out time within one series of manufacture are especially large.

SUMMARY OF THE INVENTION

An object of the invention, therefore, is to produce a solenoid valve which can be practically interchangeably employed as a closing, opening, and a three-way valve.

Another object of the present invention is to produce a valve which overcomes the timing difficulties, mentioned above, arising as an inherent result of their manufacture.

Still another object of the present invention is to produce a valve for which the drop-out time is independently adjustable.

These and other objects which will become apparent in the discussion that follows are achieved, according to the present invention, by limiting the stroke movement of the valve closing element in both directions by means of interchangeable elements which serve either as a valve seat or as a limit stop and may be adjusted in the direction of the stroke.

If two valve seats are employed the valve according to the present invention operates as a three-way valve. If one of the two valve seats is replaced by a limit stop the valve becomes a one-way valve. In the latter case the valve can be made an opening or a closing valve depending on which one of the two elements is used as the valve seat and which one as the limit stop. All three valve functions are therefore possible with the employment of only *one* additional interchangeable element.

The valve of the present invention further makes possible the adjustment and setting of the air gap between the armature and the poleface that exists during winding excitation by positioning the corresponding valve seat or limit stop. This "residual air gap" is primarily determinative—to even a greater degree than is the return spring force—of the drop-out time. The stroke and, in turn, the operating time of the valve may be adjusted by positioning the opposite interchangeable element.

In a particular embodiment of the present invention it is contemplated that the valve closing element carry a ball on each of its two ends which lie in the direction of motion. The balls can be attached to the valve element by pressing them into holes in the element, until they abut the inside end of the hole and are inserted to a depth slightly greater then their radius.

A special advantage of the two one-way versions of the valve according to the present invention results from the fact that its closing time may be made shorter than the closing times of the one-way valves known in the prior art. In explanation it is necessary to refer to a fluid flow problem which attains particular importance with especially fast-acting valves (operating times in the order of 1 millisecond).

If a body having a flat lower surface lying on the likewise flat bottom of a container filled with water is to be quickly lifted, either a considerable force will be required to overcome the suction effect of the water or, if the force is not available, the lifting will be accompanied by a certain time delay. This time delay is considerably lessened if the lower surface of the body is made uneven; the delay is the least when, at the beginning, there is only a point contact between the body and the container bottom.

In the one-way valves of the prior art, the armatures or the valve closing elements, which were often one and the same, have had, in the open position, a more or less large amount of surface in contact with the limit stop. When these elements are quickly set in motion the suction effect mentioned above is operative to delay the closing stroke.

It is thus fundamental that a point contact between correspondingly hard substances is most desirable in a one-way valve configuration. This structure can be most easily realized, in practice, by making one of the contact surfaces with a ball that, to prevent loss of pulling force, is arranged outside of the operative magnetic flux. The valve closing element according to the present invention, which is provided with two balls, fulfills all of these specifications without impairing the ability of the valve to accomplish the various switching functions.

DESCRIPTION OF THE PREFERRED EMBODIMENTS

Figure 1:
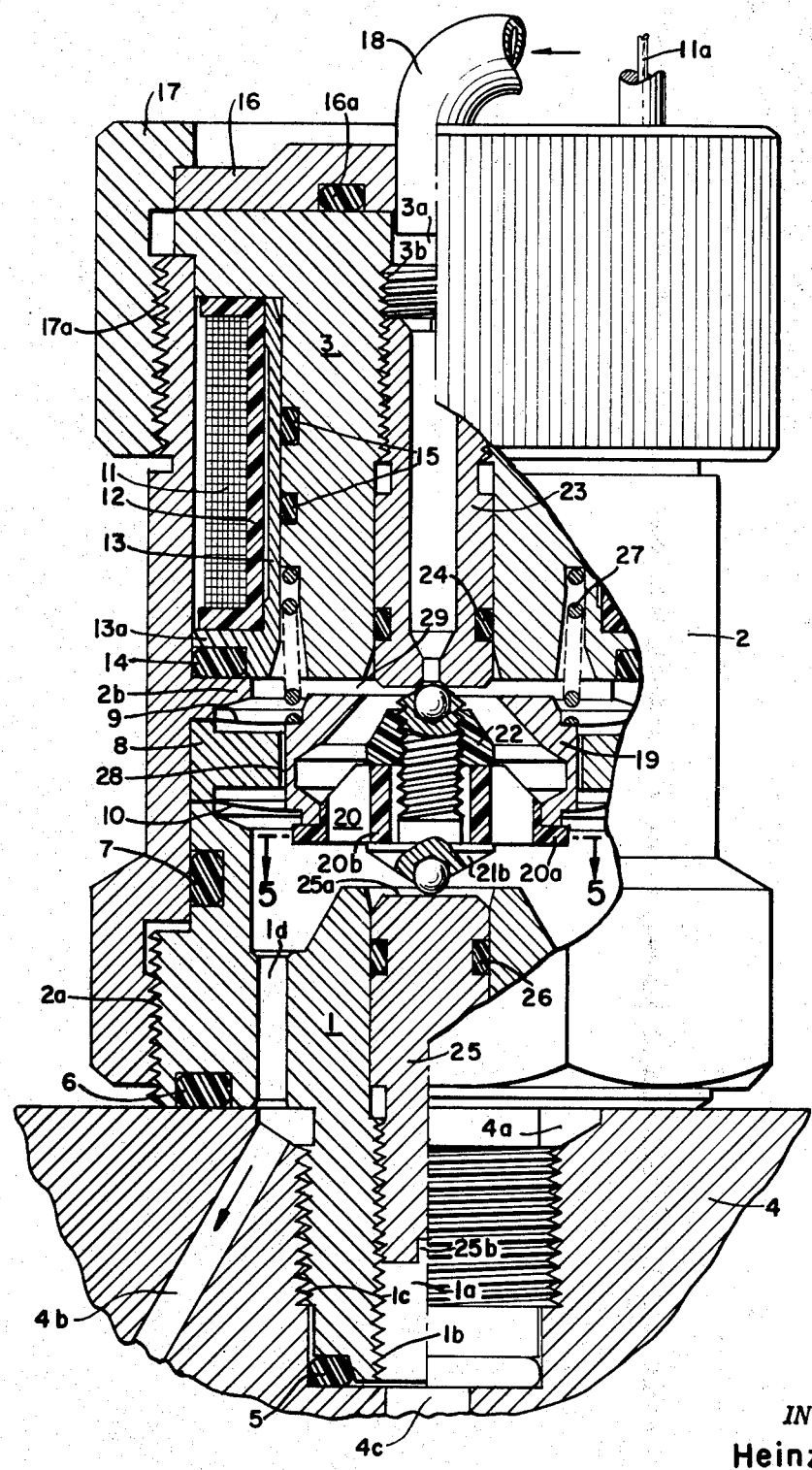
FIG. 1 is an elevational view, in partial cross section, of a solenoid valve according to the present invention four times its actual size.

Turning now to the drawings, and to FIG. 1 in particular, the prefered embodiments of the present invention will now be described. The elements 1, 2, and 3 are associated with one another to define a valve chamber in communication with a fluid passage 4b in a support 4. The major components of the solenoid valve illustrated in FIG. 1 comprise a base 1, a housing 2 and a pole member 3. The base 1 has a hole 1a passing through its center which is provided with an internal thread 1b for a portion of its length. The elongated part of the base extending downward is provided with an external thread 1c by which the base can be screw-fastened into a support 4. The broader upper part of the base which is held tight against the support 4 by the screw connection squeezes a sealing ring 6 (a so-called O-ring) made of a suitable elastic material. Another sealing ring 5 of smaller diameter is also provided at the face of the lower end of the base.

The housing 2 is screwed onto the base by means of an internal thread 2a and sealed with an O-ring 7. As the housing is screwed down over the base, a spacer ring 8 and two circular flat springs 9 and 10 arranged on both sides of the spacer are squeezed between an internal flange 2b of the housing and the upper face surface of the base. These flat springs will be discussed again in greater detail below.

The magnet winding 11, a concentric ring coil which is cast together with a plastic coil form 12, is located in the upper part of the housing 2. The winding connector lead 11a is passed out through the top of the valve. The coil form, including the winding, is inserted from the top in a space between a sleeve 13 made of non-magnetic material and the housing wall. The sleeve supports itself at its lower end with a flange 13a which abuts the housing wall and is sealed with the aid of O-rings 14 and 15 against the housing and the pole member 3, respectively. The sleeve serves to insulate the magnet winding in a pressure-free region so that the winding is protected from the mechanical stresses of the pressure or fluid medium.

The pole member 3 has a hole 3a through its center, as does the base 1, with an internal thread 3b in its upper portion. The pole member projects from above into the housing and the sleeve 13. The upper flange or wider part of the pole member 3 is adapted to the wall and upper end of the housing. A cover 16 which sits on top of the pole member is held in place by means of a knurled cap screw 17, with thread 17a, which is screwed down over the housing. The cover, therefore, presses the pole member into the housing as far as it will go, secures the winding and the sleeve against axial displacement, and provides, simultaneously, the sealing pressure for the O-ring 14. A connecting pipe 18 is soldered into the cover and opens into the central hole 3a. An O-ring 16a seals the cover against the pole member 3.

A ring-shaped armature 19 moves up and down in the space between the pole member and the base. The cylindrical outside surface of the armature is designed to form a very narrow cylindrical airgap 28 with the inside surface of the spacer ring 8. The flat springs 9 and 10 guide the movement of the armature in the axial direction so exactly that there is no friction contact with the spacer ring 8. To this end the flat springs lie with their inner edges in shoulders of the armature 19 which have been made to within a very narrow range of tolerances.

Figure 3:
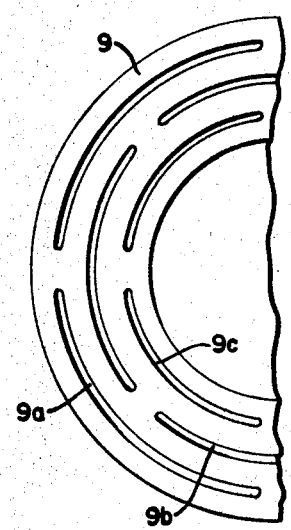
FIG. 3 is a top view of one embodiment of one of the flat springs employed in the valve shown in FIG. 1.

FIG. 3 illustrates in top view one-half of one such flat spring. The spring is manufactured as a ring-shaped plate out of very thin spring material. It is provided with three concentric rings 9a, 9b and 9c, each ring comprising four bow-shaped slits. The slits in the middle ring 9b are displaced with respect to the slits of the outer and inner ring by 45 degrees. The inner edge of the resulting form can, therefore, easily move axially with respect to the outer edge but, at the same time, is very rigid with respect to radial movement.

Figure 4:
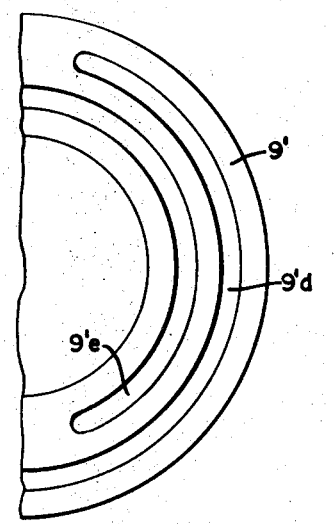
FIG. 4 is a top view of another embodiment of a flat spring of the type shown in FIG. 3.

FIG. 4 shows a second embodiment of such a spring which can be selectively used in place of the spring shown in FIG. 3. This flat spring 9' is provided with only two concentric slits 9'd and 9'e, each of which extend over an arc of approximately 330° and are displaced with respect to each other by 180°. This configuration leaves an internal ring and an external ring connected with each other by two semicircular shaped spring arms. The local bending stress of the spring material is thus reduced through this embodiment.

Figure 5:
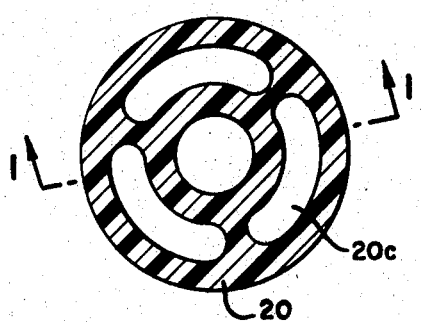
FIG. 5 is a cross section through a connecting member used in the valve shown in FIG. 1.
Figure 6:
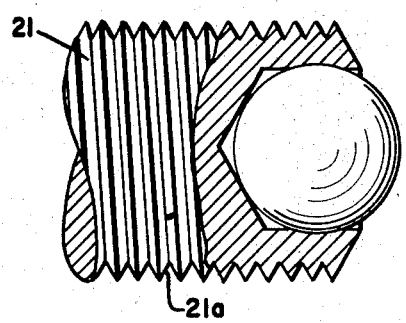
FIG. 6 is an enlarged view, partially in cross section, of one end of the valve closing element employed in the valve shown in FIG. 1.

A connecting member 20 made of synthetic material is inserted and glued into the armature 19 from below. A cross section taken through this member is shown in FIG. 5. The connecting member is comprised of an outer flange 20a and an inner hub 20b which are joined together by three radially running ribs. This configuration thus leaves three kidney-shaped openings 20c as shown in FIG. 5. A metal closing element 21 is held laterally movable in the hub 20b. The closing element comprises a shaft and a flat head 21b. The shaft, the end of which is shown, further enlarged, in FIG. 6, is provided with threads 21a. The outer diameter of the shaft is considerably smaller than the inner diameter of the hub. The flat head, which is larger than the inner diameter of the hub, is placed from below against the face side of the hub while from above a nut 22 made of synthetic material is screwed down. This nut holds the closing member in place but is loose enough to permit lateral movement thereof. An upper and a lower steel ball, not designated with element numbers, each serve as the actual sealing member, or, if desired, the limit stop contact. These balls are tightly pressed into holes located at the center of both ends of the closing member to a depth slightly greater than their radius. The inner walls of the holes are deformed in the process so that they cling to the ball. To insure that the balls remain in place it is also possible to lightly flange over the rims of the holes onto the balls.

A component 23 is screwed into the thread 3b of the pole member and serves both as a valve seat and to limit the upward movement of the armature. This component 23 is separately illustrated, upside down, in FIG. 2. The component 23 is provided with a hole 23a through its center and an O-ring groove 23b. The corresponding O-ring 24 seals this component against the pole member 3 without impairing the ability of the component 23 to move in the longitudinal direction. A screw driver slot 23c is provided at one end of the component 23 to facilitate adjustment in the longitudinal direction. The central hole through this component narrows at the other end and then opens into a cone. This cone is the valve seat 23d against which the respective ball is pressed.

A component 25 limits the downward stroke movement of the armature. The outer dimensions of this component are similar to that of component 23; that is, however, not provided with a hole through the center. The upper face 25a of this component 25 is a flat case hardened surface upon which the lower ball of the closing element can impinge. A screwdriver slot 25b provides easy adjustability for this component 2; an O-ring 26 provides a seal between this component and the base 1.

The solenoid valve illustrated in FIG. 1 works as a one-way closing valve. When the magnet winding is not excited, a coil spring presses the armature, including the closing member, downward so that the lower ball is in contact with the face 25a of the limit stop component 25 and the upper ball clears the valve seat 23d. One end of the coil spring 27 presses against the inner edge of the flat spring 9 holding this flat spring against the armature. The other end of the coil spring 27 is propped against a shoulder of the pole member 3. When the armature and pole member are in this position the pressure medium can enter the inlet pipe 18 and pass through the hole 3a and 23a, the valve seat, the armature and the openings 20c of the connecting member to an eccentric longitudinal hole 1d in the base. The hole 1d opens into an annular canal 4a recessed in the support 1 which is provided with a slanting hole 4d that serves as an outlet for the pressure medium. When the winding is excited the armature moves upward against the force of the coil spring 27 pressing the upper ball into the valve seat.

If the two components 23 and 25 are exchanged, the valve becomes an opening valve. In this case the inlet pipe 18 remains unused. The pressure medium is introduced through the slanting hole 4b and leaves the valve through the hole 1a in the center of the base. This hole 1a extends into a hole 4c in the support 4.

Figure 2:
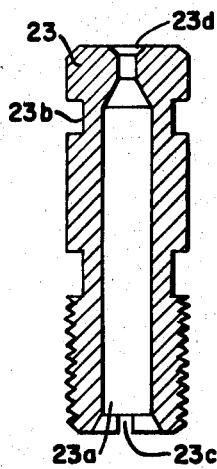
FIG. 2 is a cross-sectional view of the valve seat element used in the valve shown in FIG. 1.

If now, the limit stop component 25 is exchanged for a valve seat component as illustrated in FIG. 2, and the upper valve seat component, as shown in FIG. 1, is left in, the solenoid valve turns into a three-way valve. Both balls can now operate as sealing members.

If the valve is screwed out and the cover removed, both screwdriver slots become accessible. The dropout time of the valve may first be set by adjusting the upper component since the dropout time is determined by the residual airgap 29 between the pole member and the armature when the magnet winding is excited. This residual or working airgap can, for example, be set equal to 0.05 mm. The operating time of the valve, which depends on the stroke of the armature (for example, 0.3 mm.) can then be adjusted by means of the lower component. After both actuating valves are brought to within the desired tolerances, both components can be fixed, in addition, with one drop each of a hardened sizing.

The form of the armature, the connecting member and the closing member of the valve according to the present invention results in an unusually small weight for these movable parts. The cross section of the armature is very thin in its lower portion but increases sharply in the upper direction so that the surface of the upper face approximately equals the inner cylindrical surface of the spacer ring 8 which determines that part of the vertical cylindrical surface of the armature that serves to pass the magnetic flux.

The magnetic flux runs from the elongated portion of the pole member 3 through the upper flange of the pole member 3 to the housing. The flux then enters the spacer ring 8, which is flush against the housing, passes through the cylindrical airgap 28 to the armature, and returns through the working gap 29 to the pole member. The cross-sectional form of the armature is proportioned so as to conform with the curve of the magnetic flux in its return path.

The point contact of the lower ball with the limit stop component eliminates any suction effect when the closing member is raised. This configuration thus serves to reduce the operating time of the valve.

It will be understood that the above description of the present invention is susceptible to various modifications, changes, and adaptations, and the same are intended to be comprehended within the meaning and range of equivalents of the appended claims.

What is claimed is:

1. An electromagnetically actuated valve, comprising, in combination:
   (a) means defining a valve chamber and a fluid passage in communication with said chamber,
   (b) a solenoid winding supported by said means,
   (c) a stationary magnetic pole element made of a magnetizable material and mounted on said means in a position to be magnetized when current is passed through said solenoid winding,
   (d) valve closing means for controlling fluid flow through the valve chamber, said closing means including an armature which is made of magnetizable material and which has a portion facing said pole element and spaced therefrom by an air gap,
   (e) guide means supporting said valve closing means for movement within the valve chamber in response to the magnetizing of said pole element,
   (f) spring means for urging said valve closing means away from said pole element when said winding is de-energized,
   (g) first limit means mounted on said means defining a valve chamber on one side of said valve closing means for limiting the movement of said valve closing means toward said pole element so as to maintain said armature portion spaced from said pole element and to give said air gap a predetermined length when current is passed through said winding, and
   (h) second limit means mounted on said means defining a valve chamber on the other side of said valve closing means for limiting the movement of said valve closing means away from said pole element under the influence of said spring means when current does not flow through said winding, and
   (i) both of said limit means being adjustable for adjusting the distance of the respective limiting movement of said valve closing means with respect to said pole element.

2. The valve defined in claim 1 wherein for making at least one of said limit means adjustable, said limit means is provided with thread means for screwing said limit means into a bore provided in said means defining a valve chamber to a desired depth.

3. The combination defined in claim 1 wherein said first and second limit means are so constructed that they are interchangeable with one another.

4. The combination defined in claim 1 wherein said first limit means has a fluid passage therethrough communicating with said valve chamber and includes means forming a valve seat cooperating with said valve closing means for enabling said valve closing means to move in a direction to block fluid flow between said valve chamber and said fluid passage when current is passed through said winding, whereby said valve constitutes a one-way closing valve which is closed by energization of said winding.

5. The combination defined in claim 4 wherein said first and said second limit means, and said means defining a valve chamber are so constructed as to permit interchange of said first and second limit means.

6. The combination defined in claim 1 wherein said second limit means has a fluid passage therethrough communicating with said valve chamber and includes means forming a valve seat cooperating with said valve closing means for enabling said valve closing means to move in a direction to block fluid flow between said valve chamber and said fluid passage when current does not flow through said winding, whereby said valve is a one-way opening valve opened by energization of said winding.

7. The combination defined in claim 1 wherein each of said limit means has a fluid passage therethrough communicating with said valve chamber and a valve seat which cooperates with said valve closing means, whereby said valve is a three-way valve in which said valve closing means moves in a direction to block fluid flow between said valve chamber and said passage in said first limit means when current flows through said winding and moves in a direction to block fluid flow between said valve chamber and said passage in said second limit means when current ceases to flow through said winding.

8. The combination defined in claim 1 wherein said valve closing means comprises two balls mounted at opposite sides thereof, one of said balls being arranged to contact said first limit means and the other of said balls being arranged to contact said second limit means.

9. The combination defined in claim 8 wherein said balls are pressed into mounting holes provided in the said valve closing means, so that each ball is inserted to a depth slightly greater than its radius.

References Cited

UNITED STATES PATENTS

| | | | |
|---|---|---|---|
| 1,822,668 | 9/1931 | Protzeller | 251—129 |
| 2,863,473 | 12/1958 | Gantz | 251—139 XR |
| 374,088 | 11/1887 | Roosevelt | 251—139 XR |
| 2,366,412 | 1/1945 | Lambert | 251—139 XR |
| 2,616,452 | 11/1952 | Clay et al. | 251—139 |
| 2,855,947 | 10/1958 | Lee | 137—269 |
| 3,231,233 | 1/1966 | Herion | 251—139 |

FOREIGN PATENTS 739,076  10/1955  Great Britain.

HENRY T. KLINKSIEK, Primary Examiner

U.S. Cl. X.R.

137—625.65; 251—129, 139